Patented Apr. 1, 1941

2,236,518

UNITED STATES PATENT OFFICE 2,236,518

PREPARATION OF ORGANIC NITROGENOUS BASE SALTS

Frank J. Cahn and Morris B. Katzman, Chicago, Ill., assignors to The Emulsol Corporation, Chicago, Ill., a corporation of Illinois No Drawing. Application January 5, 1940, Serial No. 312,500

17 Claims. (Cl. 260—401)

This invention relates to novel methods of preparing chemical compounds.

More specifically, the invention is concerned with the preparation of organic nitrogenous base salts of interface modifying agents in the form of derivatives, particularly esters, of lipophile materials such as higher molecular weight fatty acids and higher molecular weight alcohols, wherein said agents contain at least one acid function in unesterified form which retains its salt-forming capacity. These include, for example, sulphates, sulphonates, phosphates, borates, phthalates, succinates, maleates, fumarates, tartrates, citrates, azelaiates, oxalates, malonates, sebacates, mellitates, mucates, saccharates, and other salt-forming polybasic acid derivatives, especially esters, of lipophile materials. The invention is concerned with a novel and effective process for producing organic nitrogenous base salts of such and similar derivatives.

Various of these compounds including, for example, sulphates, sulphonates, phosphates and borate derivatives of lipophile materials such as higher molecular weight fatty acids and alcohols have been heretofore produced, as shown, for example, in the following United States Patents: 1,897,741; 1,917,250; 1,917,255; 1,968,793; 1,968,794; 1,968,796; 1,968,797; 2,006,309; 2,023,387; 2,028,091; 2,052,027; 2,077,005; 2,026,785; 2,052,029; 2,053,653; 2,094,489; and 2,178,139. In certain cases, it has already been proposed to produce alkylolamine and amine salts of sulphates of higher molecular weight alcohols. It has been found, however, that such compounds and others, not heretofore known, may be prepared in a relatively simple and expeditious manner, all as more fully pointed out hereinafter.

In general, the organic nitrogenous base salts, particularly the alkylolamine salts, of the compounds herein contemplated are more readily soluble in cold water than the corresponding alkali metal or ammonium salts and, for certain purposes, the preparation of compounds which are soluble in cold water to the extent of at least several percent or at least 5%, and preferably from 15% to 25%, is quite important.

The novel method of the present invention, generally speaking, comprises reacting an alkali metal or similar salt of a sulphonic, sulphuric or oxygenated sulphur, phosphorus, boron, or other derivative of a lipophile material such as a higher molecular weight fatty acid or alcohol, for example, lauryl potassium sulphonate, or the sulphoacetic acid amide of the lauric acid ester of monoethanolamine (potassium salt) with an organic nitrogenous base such as monoethanolamine, and with a compound which reacts with the cationic constituent of the lauryl potassium sulphonate, or the sulpho-acetic acid amide of the lauric acid ester of monoethanolamine (potassium salt) to produce a compound more insoluble than the lauryl potassium sulphonate, or the sulphoacetic acid amide of the lauric acid ester of monoethanolamine (potassium salt), whereby the more insoluble compound precipitates out and may be removed by filtration or the like, leaving the monoethanolamine salt of lauryl sulphonate, or the sulphoacetic acid amide of the lauric acid ester of monoethanolamine (monoethanolamine salt), as the case may be, in solution from which it can, if desired, be recovered by evaporation or drying of the solution.

More specifically, unusually good results may be obtained by reacting a sulphonate, sulphate, phosphate, borate or other derivative of a higher molecular weight alcohol or fatty acid derivative, such as lauryl potassium sulphate or lauryl potassium sulphonate, tartaric acid, and an organic nitrogenous base such as monoethanolamine. The reaction which takes place results in the formation of potassium acid tartrate which is quite insoluble in cold water and precipitates out, leaving in solution the monoethanolamine salt of lauryl sulphate or sulphonate, as the case may be. The reaction may be illustrated by the following equation:

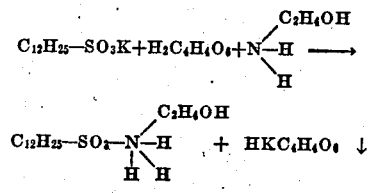

The reaction takes place when the alkali metal or similar salt of the sulphonic, sulphuric or oxygenated sulphur, phosphorus, boron or other derivative is more soluble or less insoluble than the salt or the like such as potassium acid tartrate which forms during the reaction.

In order to enable those skilled in the art to understand the nature of the invention even more fully, the following examples are given by way of illustration. It will be understood, however, that the specific reactants, the proportions thereof, and the times and temperatures may be varied within limits without departing from the spirit of the invention. The examples, therefore, are to be taken in an illustrative rather than in a limitative sense, the scope of the invention being pointed out in the claims.

Example I

A. 200 grams of crystalline lauryl potassium sulphoacetate, prepared from commercial lauryl alcohol, were dissolved in 400 cc. of water at 80 degrees C. to produce a relatively stiff paste.

B. 150 grams of tartaric acid and 141 grams of triethanolamine were dissolved in 400 cc. of water.

C. Compositions A and B were then stirred together at a temperature of about 90 degrees C. A heavy precipitate came down and the previously viscous mixture became quite mobile. The precipitate, which comprised potassium acid tartrate, was filtered off and the filtrate was then neutralized with 50 grams of triethanolamine. The final solution was quite viscous, containing in the neighborhood of 20% of lauryl triethanolamine sulpho-acetate.

Example II 18.3 grams of dodecyl potassium sulphonate ($C_{12}H_{25}$—$SO_3K$) containing 79% solids (1/20 mol) were dissolved in 30 cc. of boiling water whereby a relatively stiff paste was formed. To said paste was then added a hot solution of 8.3 grams of tartaric acid and 3.45 grams of monoethanolamine in 45 cc. of water. The stiff paste thereupon became limpid and potassium acid tartrate precipitated out. The mass was then cooled to 0° C. and filtered on a Buchner funnel and the filtrate was neutralized with 0.4 gram of monoethanolamine using litmus as an indicator. The final solution weighed 78 grams and contained 20% by weight of monoethanolamine lauryl sulphonate

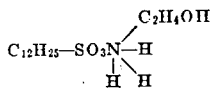

The solution had excellent sudsing, foaming, lathering and detergent properties rendering it useful, among other things, for shampoos, hair washes and the like. At temperatures as low as 3° C., there was no precipitation. At lower temperatures, a slight cloudiness or turbidity appeared which, however, disappeared on warming the solution to room temperature.

Example III 133 grams of potassium lauryl sulpho-acetate were dissolved in 700 cc. of boiling water and the resulting solution was then mixed with a previously prepared solution containing 69 grams of tartaric acid, 36.6 grams of pyridine and 200 cc. of water. The two solutions were mixed at a temperature of about 90 degrees C. and were then allowed to cool to room temperature whereupon the resulting solution was filtered from the potassium acid tartrate which had precipitated out.

Approximately 780 cc. of a yellow colored limpid solution were obtained which had excellent foaming properties in hard water as well as in the presence of alkalies and acids. The solution contained a substantial proportion of the pyridine salt of the sulpho-acetate of lauryl alcohol.

Example IV 173 grams of lauryl potassium sulpho-acetate were dissolved in 1050 cc. of boiling water and mixed with a solution containing 93 grams of tartaric acid, 51 grams of piperidine and 300 cc. of water. After cooling to approximately room temperature, the solution was filtered off from the precipitated potassium acid tartrate and the solution was then neutralized to a methyl red yellow with 20 grams of piperidine. A water-white viscous liquid was obtained possessing strong foaming properties in alkaline or acid aqueous media as well as in hard water. The solution contained the piperidine salt of lauryl sulpho-acetate.

Example V 453 grams of lauryl potassium sulpho-acetate, prepared from commercial lauryl alcohol containing about 75% lauryl alcohol, and containing about 40% water were dissolved in 1810 cc. of water previously heated to about 90 degrees C. To the above solution there was then added, at about 90 degrees C., a solution of monoethanolamine acid tartrate prepared by mixing together a solution of 60.9 grams of monoethanolamine (molecular weight 62.6) in 210 cc. of water with a solution of 146 grams of tartaric acid dissolved in 210 cc. of water.

The resulting solution was then allowed to cool for about a day at room temperature and was then decanted and filtered from the precipitate of potassium acid tartrate, the latter then being washed with 50 cc. of water and the wash water being added to the filtrate.

To the approximately 2660 grams of solution thus obtained, about 20 grams of monoethanolamine were added until methyl red gave a yellow color. The resulting solution contained a substantial proportion of the monoethanolamine salt of lauryl sulphoacetate.

Example VI

An aqueous solution of 8.1 parts, by weight, of acid methylpyridinium tartrate in 17 parts, by weight, of water was prepared by mixing one mol of 0.166 normal methylpyridinium hydroxide solution with an aqueous solution of one mol of tartaric acid and evaporating down. This solution was then heated to a temperature of about 90 degrees C. and was then added to a previously heated solution, also at about 90 degrees C., containing 10.4 parts, by weight, of lauryl potassium sulpho-acetate and 50 parts, by weight, of water. The mass was permitted to cool to approximately 25 degrees C. and the acid potassium tartrate which had precipitated out was filtered off. The resulting clear filtrate was neutralized to yellow methyl red with 20 volume parts of 0.167 normal methylpyridinium hydroxide solution. The resulting solution, containing a substantial proportion of the methylpyridinium salt of lauryl sulpho-acetate, was water-white, viscous, substantially odorless, and had excellent foaming properties in hard water as well as in aqueous acidulated media. It was very suitable for use as a hair wash or shampoo.

Example VII 432 grams of the lauric acid ester of the sulphoacetic acid amide of monoethanolamine (potassium salt), corresponding to the formula:

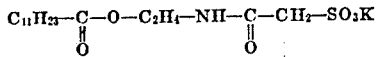

were dissolved in 1483 grams of water, at 60 degrees C., and there was added thereto, with stirring, a solution of 213 grams of tartaric acid in 213 cc. of water. There was then added thereto, with vigorous stirring, a solution of 88 grams of monoethanolamine in 88 cc. of water. The final product was cooled to about 20 degrees C. to 22 degrees C. and filtered to remove the precipitate of potassium acid tartrate which formed during the reaction. To the clear, limpid filtrate, 11 cc. of monoethanolamine were added in order to neutralize the solution to a pH of about 6.0. The solution contained a substantial proportion of the monoethanolamine salt of the sulpho-acetic acid amide of the lauric acid ester of monoethanolamine, said compound having the following formula:

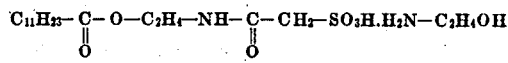

The solution had excellent foaming and detergent properties and was ideally suited for use as a hair shampoo. If desired, the consistency of the solution can be increased, or, in other words, the solution may be thickened by adding thereto monoethanolamine sulphate. This was conveniently accomplished by making up the volume of the clear limpid filtrate to 2750 cc. by the addition thereto of water and there were then added thereto, with stirring, 1150 cc. of an aqueous solution containing 40% monoethanolamine sulphate, namely, the sulphuric acid salt of monoethanolamine. The final product was a clear, viscous material which was very satisfactory as a shampoo base.

*Example VIII*

(1) 2000 grams of a product consisting essentially of a compound having the following formula:

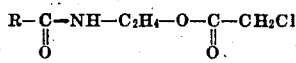

being the acyl radical of coconut oil mixed fatty acids, comprising largely lauric acid), 735 grams of potassium metabisulphite (K₂S₂O₅), 370 grams of potassium hydroxide and 2210 cc. of water were heated for ½ hour at 90 degrees C. to 95 degrees C. The temperature rose to 100 degrees C. during the reaction; a total of 700 grams of crushed ice was added in order to control the temperature.

(2) To the reaction mass produced as described in part (1) hereof, 5000 cc. of water and 2364 grams of tartaric acid were added with constant stirring at a temperature of about 70 degrees C. There were then added, with stirring, 1000 grams of monoethanolamine. The mass was allowed to cool to room temperature and the precipitate of potassium acid tartrate, which had formed during the reaction, was filtered off. To 1000 grams of the clear solution, 570 cc. of water and 188 cc. of monoethanolamine were added to bring the product to a pH of about 6.3. The resulting solution had foaming and detergent properties and contanied a substantial proportion of a compound having the following formula:

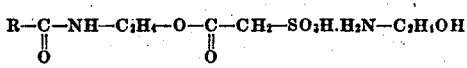

(where

has the same significance as described hereinabove).

*Example IX*

161 grams of the lauric acid ester of the sulphoacetic acid amide of monoethanolamine (potassium salt) were dissolved in 600 cc. of water at 60 degrees C., 66 grams of tartaric acid were added and the mass stirred until the tartaric acid had dissolved, and then 62.5 grams of triethanolamine were added thereto and mixed with the solution. The precipitate of potassium acid tartrate was filtered off and, to the resulting filtrate, 12 grams of triethanolamine were added to bring the product up to a pH of about 6.0. The solution, which had good foaming and detergent properties, contained a substantial proportion of the triethanolamine salt of the sulphoacetic acid amide of the lauric acid ester of monoethanolamine, said compound having the following formula:

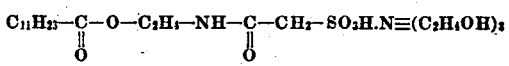

Instead of employing tartaric acid, as described above, oxalic acid and other acids such as perchloric acid or acids of organic character can be used whose alkali metal or other salts or acid salts are more insoluble than the salt of the sulphonic acid derivative or the like employed as one of the reactants, at the concentrations and under the conditions of the reaction. Tartaric acid is preferred, however, because of the unusually low cold-water solubility of potassium acid tartrate.

If it is desired still further to decrease the solubility of the salt, such as potassium acid tartrate, methyl alcohol, ethyl alcohol or other organic solvents may be added to the reaction mixture to provide an environment in which the potassium acid tartrate or the like is even still more insoluble than it is in cold water alone.

The preferred compounds whose organic nitrogenous base salts may be produced in accordance with the novel teachings of the present invention, as described hereinabove, are generally characterized by the presence of at least one higher molecular weight lipophile group containing preferably at least eight carbon atoms, preferably, although not necessarily, aliphatic in character, and by the presence of at least one hydrophile or hydrophillic group, preferably in the form of an oxygenated sulphur, phosphorus, boron, arsenic or carbon radical; or the like, particularly sulphur in the form of sulphate or sulphonic acid radicals. Preferably, the lipophile and hydrophile groups are in a state of "balance" whereby the resulting compound has the property of reducing the spattering of margarine when used for frying. This concept of "balance" of lipophile and hydrophile groups is treated in considerable detail in the patent to Benjamin R. Harris, No. 1,917,250, issued July 11, 1933 and need not here be elaborated upon further. While this "balance" may be determined empirically by means of a margarine frying test, as described in said patent, those skilled in the art will, in most cases, readily be able to predict the existence of "balance" from merely an inspection of the structure of the molecule of the compounds themselves. As a general rule, the hydrophile and lipophile groups should preferably be at the ends or extremities of the molecule as, for example, in the case of lauryl monomethanolamine sulphate wherein the lauryl group or, in other words, the lipophile group, is present at one end of the molecule, and the sulphate or hydrophile group is present at the other end of the molecule.

It will be understood that the term "Lipophile groups" includes groups having a definite affinity for oils and fats and comprises, for example, alkyl, aralkyl, aryl, ether or ester groups containing preferably at least eight carbon atoms. The lipophile group possesses predominantly hydrocarbon characteristics and, in general, is derived from triglyceride fats and oils, waxes, mineral oils, other hydrocarbons, and the like.

In contra-distinction thereto, the term "hydrophile group" or "hydrophillic group" includes groups which possess an affinity for water and aqueous media and which, in the instant case, include, among others, the following: sulphate, sulphonic, phosphate, pyrophosphate, tetraphosphate, borate, lower molecular weight sulpho-carboxylic acids such as sulpho-acetates, sulpho-propionates, sulpho-succinates, sulpho-citrates, sulpho-glutarates, polycarboxylic acids, hydroxypolycarboxylic acids, etc.

Among the oxygenated sulphur derivatives, several members of which have excellent sudsing, foaming, frothing, lathering and detergent powers, are, as previously pointed out, the higher molecular weight alcohol sulphates and sulphonates. The alcohols from which these sulphates and sulphonates may be prepared include the following: aliphatic straight chain and branched chain alcohols such as hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tetra-decyl, hexadecyl and octadecyl aliphatic alcohols as, for example, 2-ethyl hexanol-1, 2-n butyl octanol-1, 2-butyl tetra-decanol-1, and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols which may be employed are the cyclo-aliphatic or ali-cyclic alcohols such as the sterols, as, for example, cholesterol, iso-cholesterol, phytosterol, sitosterol, hydro-aromatic and aromatic alcohols such as abietol, benzyl alcohol, naphthenyl alcohol, borneol, menthyl alcohol, xylenols, cresols, and such unsaturated alcohols as linalool, citronellol, geraniol and the like. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, i-hydroxy-stearic acid, alpha-hydroxy palmitic acid, and the like, as well as esters of hydroxy-fatty acids, such as ethyl recinoleate, castor oil, butyl alpha-hydroxystearate, cetyl hydroxystearate, and the like.

The term "alcohols", as employed herein, is intended to include alcohols which may or may not contain other groups such as carboxylic, carbonyl, cyanogen, sulphone, sulphoxide, halogen, sulphonic, sulphate, or other radicals. The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the sulphates and sulphonates may be produced. As examples of such alcohols may be mentioned, partially esterified or partially etherified sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, mono-lauryl ether of glycerol, di-cetyl ether of glycerol, monostearic acid ester of diethylene glycol, monolauric acid ester of ethylene glycol, and the like.

It is, of course, obvious that the alcohols from which the sulphates and sulphonates may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols may be utilized in the preparation of the sulphates and sulphonates as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$. Again, mixtures of alcohols such as are present in the so-called sperm oil alcohols, as well as those present in wool-fat, may equally efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

These sulphates and sulphonates, produced in accordance with the invention described hereinabove, may, in general, be represented by the formula

$$R—X—Y$$

wherein R is a radical containing a hydrocarbon chain of at least eight carbon atoms, X is a sulphuric or sulphonic group present at or near an extremity of the radical represented by R, and Y is an organic nitrogenous base cation.

In a still more specific aspect of this class of compounds, the suphates may be represented by the formula

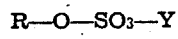

$$R—O—SO_3—Y$$

wherein R represents the residue of a normal primary alcohol containing from 8 to 18 carbon atoms, and Y represents an organic nitrogenous base cation such as that of monoethanolamine or the like.

The oxygenated phosphorus derivatives whose organic nitrogenous base salts may be produced in accordance with the present invention are those compounds which correspond to the higher molecular weight alcohol sulphates and sulphonates described hereinabove but wherein the hydrophile group comprises oxygenated phosphorus instead of oxygenated sulphur. Among these compounds which may be produced in the manner indicated above may be mentioned lauryl monoethanolamine pyrophosphate, palmityl pyridine orthophosphate, lauryl triethanolamine tetraphosphate, oleyl monoethanolamine pyrophosphate, monolauric acid ester of diethylene glycol tetraphosphate, monoethanolamine salt, and the like. These compounds are disclosed, aside from patents referred to hereinabove, in Patents Nos. 2,177,650 and 2,128,946 and in the following pending application: Application of Benjamin R. Harris, Serial No. 207,507, filed May 12, 1938.

Again, in place of either the oxygenated phosphorus or oxygenated sulphur compounds, similar as well as corresponding oxygenated boron compounds may be employed. These include boric acid esters of higher molecular weight alcohols such as lauryl monoethanolamine borate, cetyl pyridine borate, and boric acid esters of monoglycerides of higher fatty acids such as monolaurin triethanolamine borate. For a more complete description of boric acid derivatives, reference may be had to United States Patent No. 2,052,192.

Another group of compounds whose organic nitrogenous base salts may be produced in accordance with the principles of the present invention are the lower molecular weight sulphocarboxylic acid esters of higher molecular weight alcohols such as those described hereinabove. Among these compounds may be mentioned octyl pyridine sulphoacetate, lauryl sulphoacetate monoethanolamine or triethanolamine salt or other organic nitrogenous base salts such as those described hereinabove, cetyl piperidine sulphoacetate, and the like. For a more complete description of sulpho-carboxylic acid esters, reference may be had, apart from patents previously referred to, to the following pending applications and issued patents: Application of Benjamin R. Harris, Serial No. 627,096, filed July 30, 1932, now Patent No. 2,190,921, issued February 20, 1940; application of Frank J. Cahn and Morris B. Katzman, Serial No. 166,388, filed September 29, 1937, now Patent No. 2,185,455, issued January 2, 1940; and Patent Nos. 2,166,141; 2,166,142; and 2,166,143.

Still another group of sulphonic and sulphate derivatives whose organic nitrogenous base salts may be prepared in accordance with the teachings of the present invention are the compounds which correspond to the general formulae:

(1)      R—CO—NX$_n$(YM)=

(2)      R—C—O—Y—M
              ‖
              O wherein R is an aliphatic hydrocarbon radical containing at least 7 carbon atoms and preferably between 11 and 17 carbon atoms, X is hydrogen, $n$ is either zero or one, Y is a lower molecular weight hydrocarbon or alkylene or substituted radical such as —C$_2$H$_4$—, —C$_3$H$_6$—, —C$_4$H$_8$—, or the like, or similar radicals interrupted by oxygen or sulphur in the chain, such as —C$_2$H$_4$—O—C$_2$H$_4$— or —C$_2$H$_4$—S—C$_2$H$_4$— or the like, M is an oxygenated sulphur-containing inorganic acid radical such as

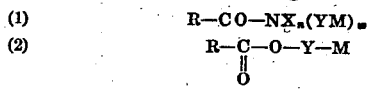

or the like, and $w$ is a small whole number. As illustrative of these compounds may be mentioned the following:

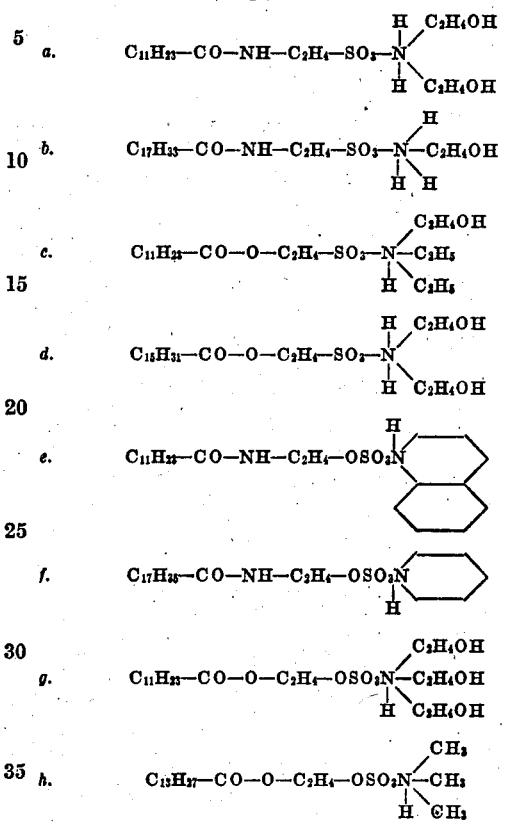

Compounds of the general type and others of similar nature are disclosed in the following United States patents: 1,931,540; 1,932,177; 1,932,180; and 1,981,792. It will be understood that the radical R in the above general formulae may be derived from higher molecular weight aliphatic, fatty, cyclo-aliphatic, aromatic, and hydroaromatic acids, saturated and unsaturated, such as the following: caprylic acid, caproic acid, capric acid, behenic acid, arachidic acid, erucic acid, cerotic acid, melissic acid, stearic acid, oleic acid, ricinoleic acid, linoleic acid, linolenic acid, margaric acid, lauric acid, myristic acid, palmitic acid, mixtures of any two or more of the above mentioned acids or other acids, mixed higher fatty acids derived from animal or vegetable sources, for example, lard, coconut oil, sesame oil, corn oil, cottonseed oil, sardine oil, tallow, partially or completely hydrogenated animal and vegetable oils such as those mentioned; hydroxy and alpha-hydroxy higher aliphatic and fatty acids such as di-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; aliphatic acids derived from various waxes such as beeswax, spermaceti, montan wax, and carnauba wax and higher molecular weight carboxylic acids derived, by oxidation and other methods, from petroleum; hydro-aromatic acids such as abietic acid; aromatic acids such as naphthoic acid, hydroxy aromatic acids such as hydroxy naphthoic acids, and the like.

Still another class of sulphonic derivatives whose organic nitrogenous base salts may be prepared in accordance with the teachings of the present invention are the sulphonated derivatives of alkylated or aralkylated polynuclear hydrocarbons such as, for example, butyl naphthalene sulphonic acid monoethanolamine salt, benzyl naphthalene sulphonic acid triethanolamine salt, iso-propyl naphthalene sulphonic acid pyridine salt, etc. Particularly contemplated are the organic nitrogenous base salts of those polynuclear derivatives, such as those of naphthalene, which contain alkyl, aralkyl or hydroaromatic radicals with three carbon atoms and upwards.

A further group of compounds whose organic nitrogenous base salts may be prepared in accordance with the principles of the present invention are higher molecular weight carboxylic acids and derivatives thereof wherein at least one hydrogen attached to the carbon atom adjacent to the carboxyl group of said carboxylic acids is replaced by a radical having strong hydrophillic properties comprising, for example, oxygenated sulphur and oxygenated phosphorus radicals. Examples of such compounds are as follows:

(1) CH₃—(CH₂)₁₁—CH—COONa

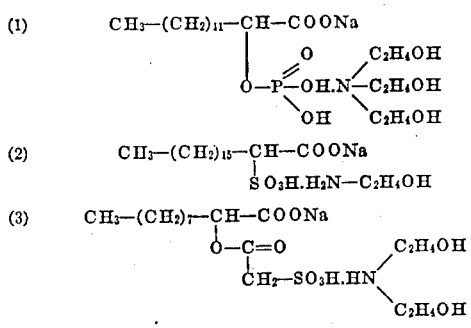

(2) CH₃—(CH₂)₁₅—CH—COONa
           |
           SO₃H.H₂N—C₂H₄OH (3) CH₃—(CH₂)₇—CH—COONa
           |
           O—C=O        C₂H₄OH
           |           /
           CH₂—SO₃H.HN
                       \
                        C₂H₄OH

Another group of compounds whose organic nitrogenous base salts may be prepared in accordance with the present invention, as indicated in Examples VII and IX, are those disclosed in the copending application of Morris B. Katzman, Serial No. 219,358, filed July 15, 1938, now Patent No. 2,184,770, issued December 26, 1939. At least most of the compounds disclosed in said application correspond to the following general formula:

RO—(alk—NY)ₘ—CO—Z(X)w wherein R is an organic radical containing at least four carbon atoms, alk and Z are each members selected from the class consisting of hydrocarbon radicals and substitution products thereof, Y is a member selected from the group consisting of hydrogen, alkyl, cycloalkyl, alkoxyl, aralkyl, aryl, and alkylol, m and w are whole numbers, and X is a sulphonic radical.

A more specific aspect of said compounds is represented by the general formula

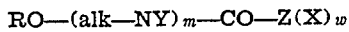

wherein

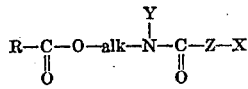

is an aliphatic acyl radical containing at least eight carbon atoms, alk is hydrocarbon, Y is a member selected from the group consisting of hydrogen, alkyl, cycloalkyl, alkoxyl, aralkyl, aryl, and alkylol, Z is a hydrocarbon residue, and X is a sulphonic group.

Additional groups of compounds which may be treated by means of the process of the present invention include those which are disclosed in the following copending applications:

| Inventor | Serial No. | Filed |
|---|---|---|
| Albert K. Epstein et al | 222,779 | August 3, 1938, now Patent No. 2,198,806, issued April 30, 1940. |
| Morris Katzman | 255,220 | February 8, 1939. |
| Albert K. Epstein et al | 285,956 | July 22, 1939. |
| Do | 280,526 | June 22, 1939. |
| Morris B. Katzman | 283,141 | July 7, 1939. |
| Morris Katzman | 286,777 | July 27, 1939. |
| Morris Katzman et al | 286,776 | July 27, 1939. |
| Do | 291,898 | August 25, 1939. |
| Albert K. Epstein et al | 296,918 | September 28, 1939. |

Representative compounds disclosed in said applications, whose organic nitrogenous base salts may be prepared in accordance with the process of the present invention, comprise the following:

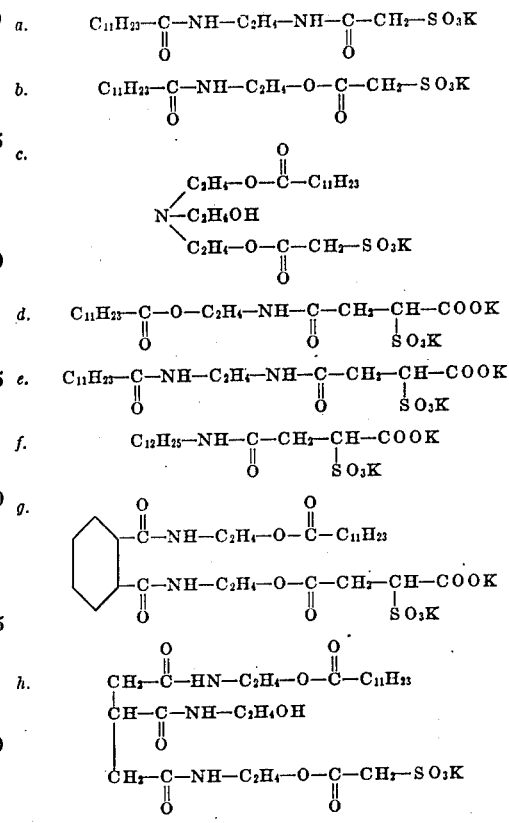

Among the organic nitrogenous bases which may be employed in preparing the salts of the compounds in accordance with the present invention are, for example, alcohol amines and alkylolamines including monoethanolamine, diethanolamine, triethanolamine, propanolamines, butanolamines, pentanolamines, hexanolamines, glycerolamines, diglycerolamines, derivatives of hydroxylamine, dibutyl ethanolamine, diethanol ethyl amine, cyclohexyl ethanolamine, alkylol polyamines such as alkylol derivatives of ethylene diamine, mono-methyl monoethanolamine, diethyl monoethanolamine, 1-amino-2, 3-propanediol; 1,2-diamino-propanol; dimethylol-amino propane; trimethylol-amino methane; 2-methylamino-propan-diol-1,3; 1-phenylamino-propan-diol-2,3; 1-hydroxyethyl-amino-2, methoxy-propan-ol-3; 2-amino-2-methyl-1, 3-propanediol; 2-amino-2-n-propyl-1,3-propanediol; 2-amino-2-isopropyl-1, 3-propanediol; hydroxyamines derived from various polyhydric alcohols, including sugars and sugar alcohols such as mono- and poly-amines derived from dextrose, sucrose, sorbitol, mannitol, dulcitol, arabitol and the like; alkylamines such as butylamine, dimethylamine, ethylene diamine, diethylene triamine, triethylene tetra-amine, monomethyl ethylene diamine, monoethyl diethylene tetra-amine, aromatic and heterocyclic bases such as pyridine, quinaldine, piperidine, methylpyridine, and homologues and derivatives thereof, quaternary ammonium bases or hydroxides such as tetramethyl ammonium hydroxide, tetra-ethyl ammonium hydroxide, quaternary ammonium bases with dissimilar alkyl radicals such as methyltriethyl ammonium hydroxide, propyl-trimethyl ammonium hydroxide, and homologues and substitution derivatives of said bases, mixtures of any two or more of said bases, and the like. It will be understood that these organic nitrogenous bases may be employed in pure, impure or commercial form such as, for example, commercial triethanolamine which contains minor proportions of mono- and di-ethanolamine.

The compounds produced in accordance with the present invention have utility for interface modifying functions in general including use for softening, wetting, detergent, emulsifying, laundering and similar uses in the textile and related industries. They are useful as flotation agents in ore flotation and agglomeration practices. Those which possess good lathering, sudsing and detergent properties have unusual utility for the shampooing or cleansing of hair, particularly when employed in aqueous solutions containing at least about 5% by weight of said compounds. They may also be used for the cleaning or brushing of teeth and in cosmetic preparations such as cold creams, vanishing creams, tissue creams, shaving creams of the brushless or lathering type, and the like.

The term "solution" as employed herein and in the appended claims is employed in a broad sense to include not only true solutions but also colloidal dispersions.

The term "higher," as employed herein, is intended to mean not less than six carbon atoms and, concomitantly, the term "lower" will be understood to mean less than six carbon atoms, unless otherwise specifically stated.

The present application is a continuation-in-part of our prior application, Serial No. 190,034, filed February 11, 1938.

What we claim as new and desire to protect by Letters Patent of the United States is:

1. The method of preparing organic nitrogenous base salts of organic interface modifying agents, having a lipophile group with at least six carbon atoms and a hydrophile group, which organic interface modifying agents contain at least one acid function in unesterified form which retains its salt-forming capacity, which includes the steps of reacting an organic nitrogenous base, an organic interface modifying agent having a lipophile group with at least six carbon atoms and a hydrophile group, said hydrophile group containing a replaceable alkali metal cation, and an acid which reacts with said metal cation of said interface modifying agent to produce a salt which is less soluble than the organic interface modifying agent constituting one of the reactants, whereby a precipitate is formed, and then separating said precipitate from the solution.

2. The method of preparing organic nitrogenous base salts of organic interface modifying agents, having a lipophile group with at least six carbon atoms and a hydrophile group, which organic interface modifying agents contain at least one acid function in unesterified form which retains its salt-forming capacity, which includes the steps of reacting an organic nitrogenous base, an organic interface modifying agent having a lipophile group with at least six carbon atoms and a hydrophile group, said hydrophile group containing a replaceable potassium cation, and tartaric acid, whereby a precipitate is formed, and then separating said precipitate from the solution.

3. The method of preparing organic nitrogenous base salts of organic interface modifying agents containing a lipophile group in the form of an aliphatic acid having at least six carbon atoms and a member selected from the group consisting of hydrophilic sulphate, sulphonate, and phosphate groups, which includes the steps of reacting an organic nitrogenous base, an organic interface modifying agent containing a lipophile aliphatic acid group having at least six carbon atoms and a member selected from the group consisting of sulphate, sulphonate, and phosphate groups the acidic hydrogen of which is replaced by an alkali metal cation, and an acid which reacts with said alkali metal cation of said interface modifying agent to produce a salt which is less soluble than the interface modifying agent constituting one of the reactants whereby a precipitate is formed, and then separating said precipitate from the solution.

4. The method of claim 3 wherein said alkali metal cation is potassium.

5. The method of preparing interface modifying agents containing a fatty acid acyl radical having at least six carbon atoms and a sulphonic group, the hydrogen of the sulphonic group being replaced by an organic nitrogenous base, which comprises providing a composition containing water and a substantial proportion of the potassium salt of an interface modifying agent containing a fatty acid acyl group with at least six carbon atoms and a sulphonic group, adding an aqueous solution containing tartaric acid and an organic nitrogenous base, stirring the mixture, and removing the resulting precipitate of potassium acid tartrate.

6. The method of preparing interface modifying agents containing a fatty acid acyl radical having at least six carbon atoms and a sulphonic group, the hydrogen of the sulphonic group being replaced by an alkylolamine, which comprises the steps of reacting, in aqueous media, a potassium salt of an interface modifying agent containing a fatty acid acyl group with at least six carbon atoms and a sulphonic group, an alkylolamine, and an acid whose potassium salt is less water-soluble than the potassium salt of the interface modifying agent, whereby the more insoluble salt is precipitated, and then separating the precipitate from the solution.

7. The method of preparing organic nitrogenous base salts of chemical compounds corresponding to the general formula:

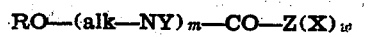

$$RO-(alk-NY)_m-CO-Z(X)_w$$

wherein R is an organic radical containing at least four carbon atoms, alk and Z are each members selected from the class consisting of hydrocarbon radicals and substitution products thereof, Y is a member selected from the group consisting of hydrogen, alkyl, cycloalkyl, alkoxyl, aralkyl, aryl, and alkylol, $m$ and $w$ are whole numbers, and X is a sulphonic radical, which comprises the steps of reacting, in aqueous media, a potassium salt of the chemical compounds defined by said general formula, tartaric acid, and an organic nitrogenous base, and separating the resulting precipitate of potassium acid tartrate.

8. The method of claim 7 wherein the organic nitrogenous base is an alkylolamine.

9. The method of preparing organic nitrogenous base salts of chemical compounds corresponding to the general formula:

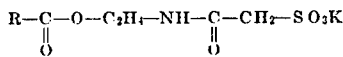

wherein

is the acyl radical of a fatty acid containing from eight to eighteen carbon atoms, which comprises the steps of reacting, in aqueous media, a compound defined by said general formula, tartaric acid, and an organic nitrogenous base, and separating the resulting precipitate of potassium acid tartrate.

10. The method of claim 9 wherein the organic nitrogenous base comprises monoethanolamine.

11. The method of preparing the monoethanolamine salt of the sulpho-acetic acid amide of the lauric acid ester of monoethanolamine which comprises providing a composition containing water and a substantial proportion of the potassium salt of the sulpho-acetic acid amide of the lauric acid ester of monoethanolamine, adding an aqueous solution containing tartaric acid and monoethanolamine, stirring the mixture at a temperature of about 90 degrees C., and removing the resulting precipitate of potassium acid tartrate after cooling said mixture.

12. The method of preparing derivatives in the form of interface modifying agents of the group consisting of sulphates, sulphonates, and phosphates of compounds containing a fatty acid radical with at least six carbon atoms, the acidic hydrogen of the sulphate, sulphonate, or phosphate group of which is replaced by an organic nitrogenous base, which includes the steps of reacting, in aqueous media, an organic nitrogenous base, tartaric acid, and a derivative selected from the group consisting of potassium salts of sulphates, sulphonates and phosphates of compounds containing a fatty acid group with at least six carbon atoms, and removing the resulting precipitate of potassium acid tartrate 13. The method of claim 12 wherein the organic nitrogenous base is an alcohol amine.

14. The method of preparing organic nitrogenous base salts of derivatives of the group consisting of sulphates, sulphonates, and phosphates of chemical compounds containing a fatty acid ester group, the fatty acid radical of which contains from twelve to eighteen carbon atoms, the acidic hydrogen of the sulphate, sulphonate, or phosphate group of which is replaced by an organic nitrogenous base, which includes the steps of reacting, in aqueous media, an organic nitrogenous base, tartaric acid, and a derivative selected from the group consisting of potassium salts of sulphates, sulphonates, and phosphates of chemical compounds containing a fatty acid ester group, the fatty acid radical of which contains from twelve to eighteen carbon atoms, and removing the resulting precipitate of potassium acid tartrate.

15. The method of claim 14 wherein the derivatives which are reacted to produce the organic nitrogenous base salts thereof comprise potassium salts of chemical compounds corresponding to the general formula:

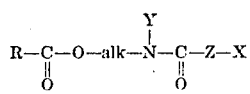

wherein

is an aliphatic acyl radical containing at least twelve carbon atoms, alk is hydrocarbon, Y is a member selected from the group consisting of hydrogen, alkyl, cycloalkyl, alkoxyl, aralkyl, aryl, and alkylol, Z is a hydrocarbon residue and X is a sulphonic radical.

16. The method of preparing organic nitrogenous base salts of chemical compounds corresponding to the general formula:

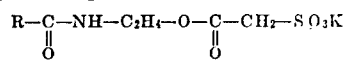

wherein

is the acyl radical of a fatty acid containing from eight to eighteen carbon atoms, which comprises the steps of reacting, in aqueous media, a compound defined by said general formula, tartaric acid, and an organic nitrogenous base, and separating the resulting precipitate of potassium acid tartrate.

17. The method of preparing monoethanolamine salts of a chemical compound corresponding to the formula

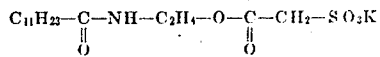

which comprises the steps of reacting, in aqueous media, the compound defined by said formula, tartaric acid, and monoethanolamine, and separating the resulting precipitate of potassium acid tartrate.

FRANK J. CAHN.
MORRIS B. KATZMAN.